US012633983B2

(12) United States Patent
Zhang et al.

(10) Patent No.: US 12,633,983 B2
(45) Date of Patent: May 19, 2026

(54) LATENCY REDUCTION IN A MULTI-BEAM WIRELESS COMMUNICATION SYSTEM

(71) Applicant: Apple Inc., Cupertino, CA (US)

(72) Inventors: Yushu Zhang, Beijing (CN); Wei Zeng, San Diego, CA (US); Dawei Zhang, Saratoga, CA (US); Weidong Yang, San Diego, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 17/911,980

(22) PCT Filed: Apr. 8, 2020

(86) PCT No.: PCT/CN2020/083735
§ 371 (c)(1),
(2) Date: Sep. 15, 2022

(87) PCT Pub. No.: WO2021/203288
PCT Pub. Date: Oct. 14, 2021

(65) Prior Publication Data
US 2023/0148159 A1 May 11, 2023

(51) Int. Cl.
*H04B 7/06* (2006.01)
*H04L 5/00* (2006.01)
(52) U.S. Cl.
CPC ......... *H04B 7/0626* (2013.01); *H04B 7/0632* (2013.01); *H04L 5/0051* (2013.01)
(58) Field of Classification Search
CPC .... H04B 7/0626; H04B 7/0632; H04L 5/0051
See application file for complete search history.

(56) References Cited

U.S. PATENT DOCUMENTS

2020/0084714 A1    3/2020    Medles
2020/0106488 A1    4/2020    Akoum
(Continued)

FOREIGN PATENT DOCUMENTS

CN    110035450    7/2019
CN    110521134    11/2019
CN    110832916    2/2020

OTHER PUBLICATIONS

3GPP TS 38.214 V16.1.0 (Mar. 2020); 3rd Generation Partnership Project; Technical Specification Group Radio Access Network; NR ; Physical layer procedures for data (Release 16) (Year: 2020).*

(Continued)

*Primary Examiner* — Justin T Van Roie
(74) *Attorney, Agent, or Firm* — Kowert, Hood, Munyon, Rankin & Goetzel, P.C.

(57) ABSTRACT

This disclosure relates to techniques for reducing latency in a multi-beam wireless communication system. A cellular base station may configure a wireless device to perform beam and channel state information measurements using beam management reference signals. The cellular base station may provide the beam management reference signals. The wireless device may perform beam measurements and channel state information measurements using the beam management reference signals. The wireless device may provide a channel state information report to the cellular base station based on the channel state information measurements performed using the beam management reference signals.

18 Claims, 7 Drawing Sheets

(56)     References Cited

U.S. PATENT DOCUMENTS

| | | | | |
|---|---|---|---|---|
| 2020/0127726 A1* | 4/2020 | Gao | ...................... | H04L 1/0026 |
| 2021/0076241 A1* | 3/2021 | Yang | .................... | H04W 24/10 |
| 2023/0246696 A1* | 8/2023 | Kim | .................... | H04B 7/0626 |
| | | | | 370/252 |

OTHER PUBLICATIONS

International Search Report and Written Opinion for PCT Patent Application No. PCT/CN2020/083735; 9 pages; Dec. 30, 2020.
Office Action for CN 202080099587.X; Apr. 30, 2025.

* cited by examiner

```
reportQuantity                 CHOICE {
    none                           NULL,
    cri-RI-PMI-CQI                 NULL,
    cri-RI-i1                      NULL,
    cri-RI-i1-CQI                  SEQUENCE {
        pdsch-BunfleSizeForCSI         ENUMERATED {n2, n4}   OPTIONAL    -- Need S
    },
    cri-RI-CQI                     NULL,
    cri-RSRP                       NULL,
    ssb-Index-RSRP                 NULL,
    cri-RI-LI-PMI-CQI              NULL,
    ssb-Index-CQI                  NULL,
    cri-CQI                        NULL,
},
```

FIG. 7

Wideband Measurement based on Joint Measurement of SSB and CSI-RS

LATENCY REDUCTION IN A MULTI-BEAM WIRELESS COMMUNICATION SYSTEM

PRIORITY CLAIM

This application is a national phase entry of PCT application number PCT/CN2020/083735, entitled "Latency Reduction in a Multi-Beam Wireless Communication System," filed Apr. 8, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for reducing latency in a multi-beam wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for reducing latency in a multi-beam wireless communication system.

According to the techniques described herein, a cellular base station may configure a wireless device to perform beam and channel state information measurements using beam management reference signals, such as synchronization signal block resources and/or channel state information reference signal resources for beam management. This may reduce the overhead and latency to perform beam, modulation and coding scheme, and precoder selection. For example, compared to an approach in which the cellular base station provides beam measurement reference signals and receives beam measurement results based on those beam measurement reference signals, then provides channel state information reference signals and receives a channel state information report based on those channel state information reference signals, such an approach may facilitate the wireless device performing channel state information measurements used for modulation and coding scheme and precoder selection to be performed at the same time as performing beam measurements used for beam selection, at least according to some embodiments.

In order to support such techniques, various possible beam and channel state information measurement framework modifications and additions are also described herein. These may include providing support for a wireless device to report capability information regarding, for example, whether it supports performing channel state information measurements using beam management reference signals, for how many beams it can support performing channel state information measurements using beam management reference signals, how many ports are available for performing channel state information measurements using beam management reference signals in each slot, etc.

Additionally, or alternatively, these may include providing support for a cellular base station to configure multiple types of beam management reference signals for joint use in performing beam and channel state information measurements, e.g., to facilitate potentially more accurate wideband channel state information measurements. As another possibility, the cellular base station may be able to configure a channel state information reporting technique to be used by a wireless device when measuring and reporting channel state information for multiple beam management reference signal resources, e.g., corresponding to multiple beams, and/or may be able to configure how the channel state information calculations are performed by a wireless device when group based beam reporting is enabled, according to various embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 7 illustrates a possible set of channel state information reporting configuration options according to which a base station could configure a wireless device, according to some embodiments.

Figure 1:
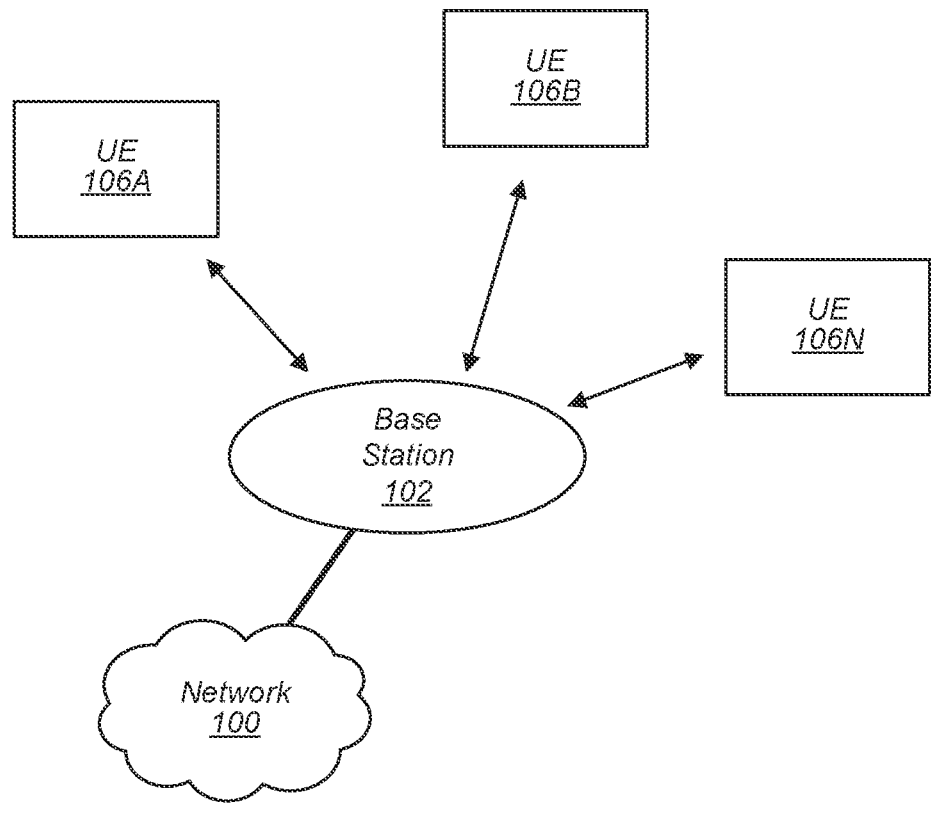
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
CSI: Channel State Information
CSI-RS: Channel State Information Reference Signals
BM: Beam Management
SSB: Synchronization Signal Block
PDSCH: Physical Downlink Shared Channel
RSRP: Reference Signal Received Power
SINR: Signal-to-Interference plus Noise Ratio
MCS: Modulation and Coding Scheme
CQI: Channel Quality Indicator
PMI: Precoding Matrix Indicator
RI: Rank Indicator
LI: Layer Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
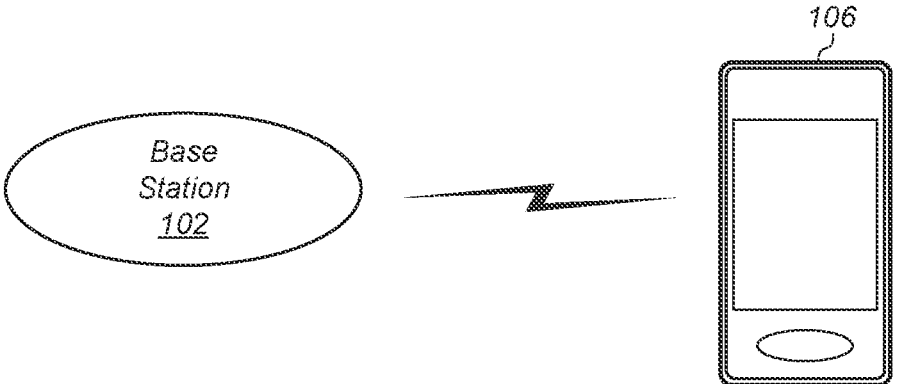
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for reducing latency in a multi-beam wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
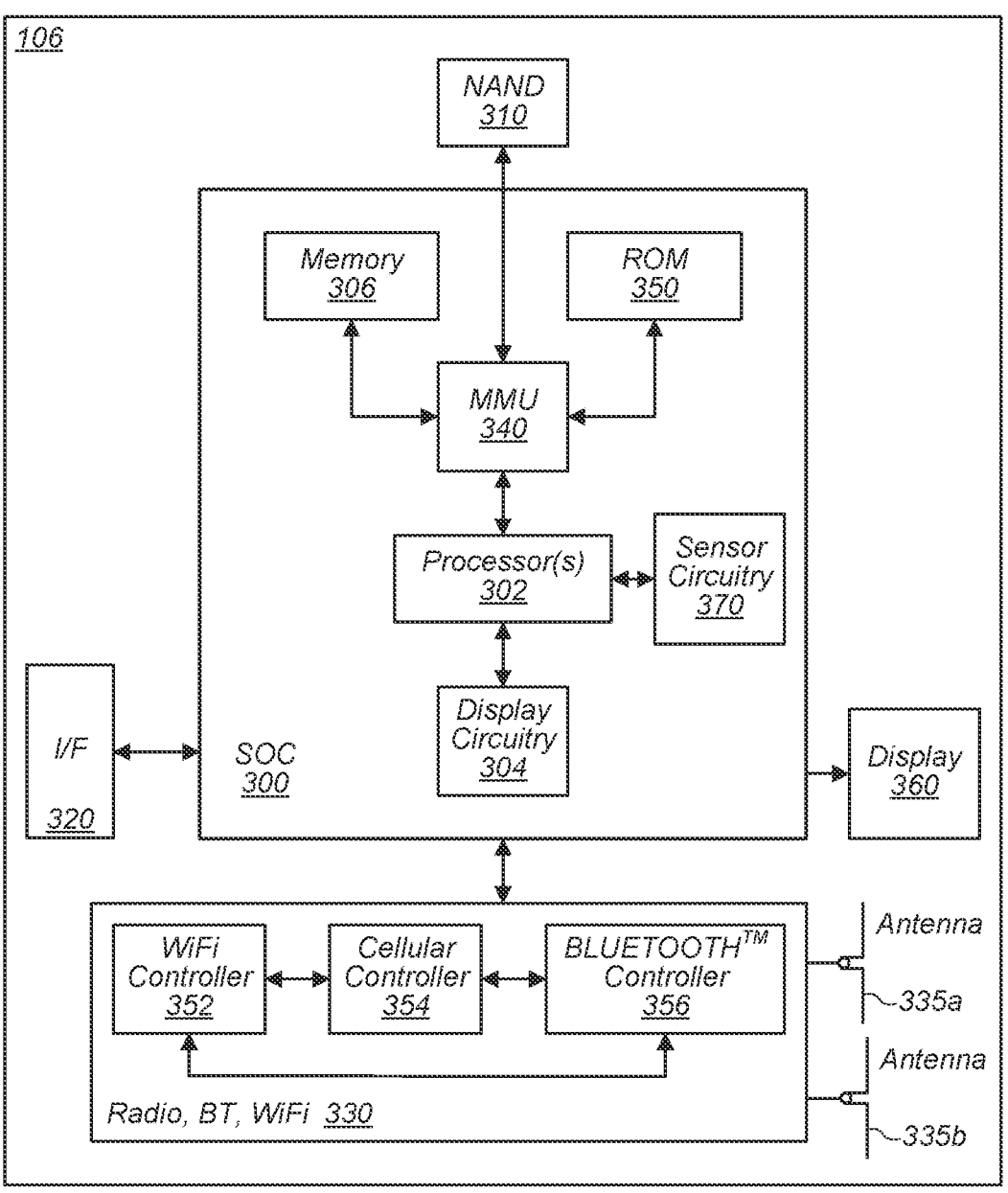
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for reducing latency in a multi-beam wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for reducing latency in a multi-beam wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
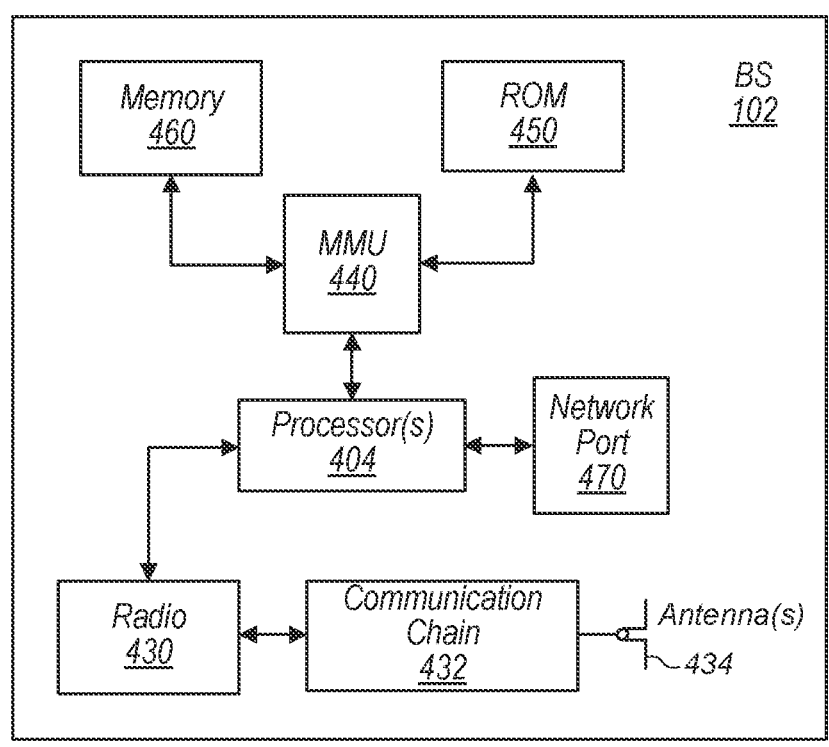
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource indicator (CRI), a SSBRI (SS/BCH Resource Block indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may include multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
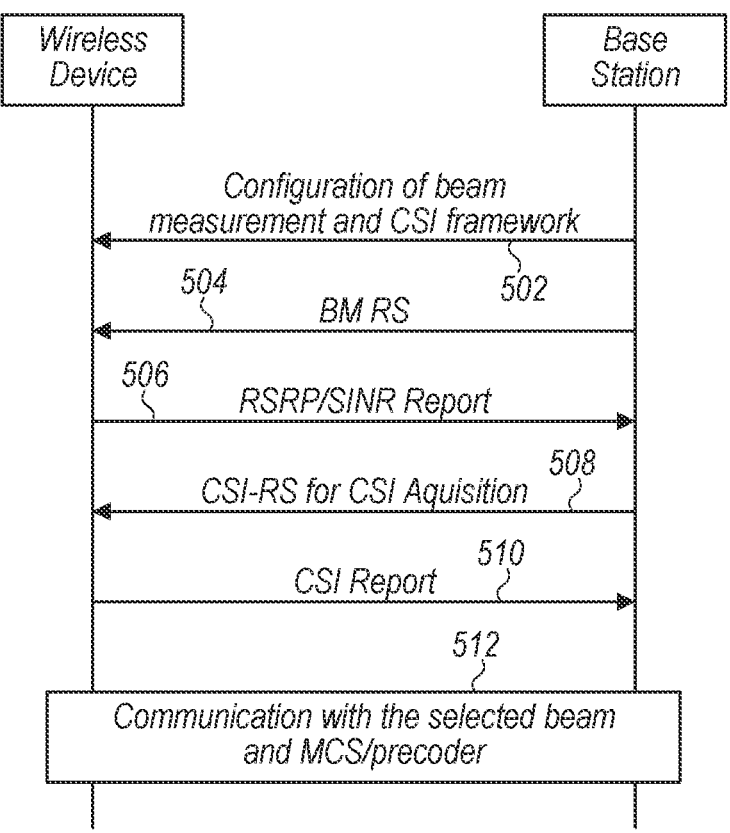
FIGS. 5-6 are communication flow diagrams illustrating possible approaches to performing beam and modulation and coding scheme selection in a wireless communication system, according to some embodiments.
Figure 6:
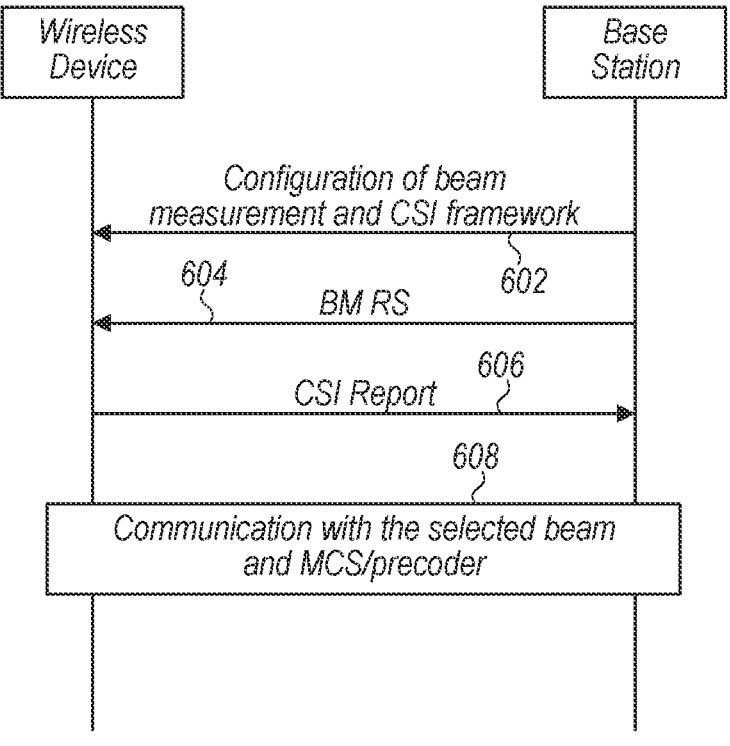

FIGS. 5-6—Beam and Channel State Information Measurement

In a cellular communication system, a wireless device may generally establish a wireless link with a cellular base station. According to some embodiments, the cellular link may operate according to LTE. For example, the wireless device may establish a session with a mobility management entity of the cellular network by way of an eNB that provides radio access to the cellular network. As another possibility, the cellular link may operate according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a radio resource control (RRC) connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least in some cellular communication systems, a cellular base station (e.g., a gNB) and a wireless device (e.g., a UE) may be capable of maintaining and/or communicating using any of multiple beams between the cellular base station and the wireless device. Beam pair selection can impact the link budget between a base station and a wireless device; for example, a good beam pair may provide a greater link budget than a bad beam pair.

In 3GPP releases 15 and 16, it may be the case that a UE can measure the beam quality based on multiple synchronization signal blocks (SSBs) or channel state information reference signal (CSI-RS) for beam management (BM) resources. Different beams can be applied to different SSBs/CSI-RSs. For the CSI-RS for BM, the CSI-RS may be configured in a resource set with the RRC parameter repetition configured, e.g., to provide support for measurement of multiple possible beams, at least according to some embodiments. The UE may measure reference signal received power (RSRP) or signal-to-interference plus noise ratio (SINR) using the various beams, to determine which beam provides the best performance.

For modulation and coding scheme (MCS) and precoder selection, the base station may further trigger a channel state information (CSI) report, which could include any or all of rank indicator (RI), precoding matrix indicator (PMI), channel quality indicator (CQI), and layer indicator (LI). At least in some instances, this measurement and reporting operation may be separate from the beam selection process, as it may be the case that the RSRP/SINR values do not reflect the channel quality on the UE side sufficiently accurately and/or in sufficient detail for effective MCS and precoder selection.

FIG. 5 is a communication flow diagram illustrating a method for performing beam, MCS, and precoder selection using such an approach, according to some embodiments. As shown, in 502, a base station may configure a beam measurement and channel state information framework for a wireless device. In 504, the base station may provide beam management reference signals, which may include SSBs or CSI-RS for BM, e.g., according to the configuration information provided by the base station. In 506, the wireless device may provide a RSRP/SINR report to the base station, e.g., based on the beam management reference signals. For example, the report may indicate measured RSRP/SINR values for some or all of the beams on which the wireless device performed measurements. This information may be used by the base station to select a beam (or multiple beams) to use when communicating with the wireless device. In 508, the base station may provide CSI-RS resources for CSI acquisition, e.g., using the selected beam(s). These may include CSI-RS included in a resource set without the RRC parameter repetition or TRS-Info configured, at least according to some embodiments. In 510, the wireless device may provide a CSI report to the base station, e.g., based on the CSI-RS for CSI acquisition. The information included in the CSI report (e.g., CQI, PMI, RI, LI, etc.) may be used by the base station to select a MCS and precoding matrix for communication with the wireless device. In 512, the base station and the wireless device may communicate using a beam, MCS, and precoder selected based on the illustrated beam, MCS, and precoder selection process.

According to the approach illustrated in FIG. 5, a significant amount of overhead and latency may be experienced prior to performing data communication, e.g., as the base station has to trigger the wireless device to report beam quality, and also separately to trigger the wireless device to report CSI. Thus, it may be beneficial, at least in some instances, to consider beam management framework enhancements that could reduce the latency and overhead for beam and MCS selection.

Accordingly, FIG. 6 is a communication flow diagram illustrating a method for reducing latency in a multi-beam wireless communication system, at least according to some embodiments.

Aspects of the method of FIG. 6 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 6 are described in a manner relating to the use of communication techniques and/or features associated with 3GPP and/or NR specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 602, the base station may configure a beam measurement and channel state information framework for the wireless device. This may include providing any of various information used to configure the wireless device to perform channel state information measurements and reporting using beam management reference signal resources, at least according to some embodiments. For example, the base station may provide beam and CSI measurement configuration information indicating beam measurement reference signal resources to use for beam and CSI measurement. The beam measurement reference signals may include SSB resources and/or CSI-RS for BM resources. In some instances, the base station may indicate that each beam measurement reference signal resource includes a respective SSB resource and one or more CSI-RS resources associated with the respective SSB resource. This may facilitate joint SSB-CSI-RS based measurements, which may help improve the accuracy of CSI reporting based on beam measurement reference signals, at least according to some embodiments.

In some embodiments, the configuration information may also indicate one or more aspects of how to perform the CSI measurements and/or reporting based on beam measurement reference signals. For example, the base station may indicate whether to perform CSI reporting on an absolute basis or on a relative basis. As another example, the base station may indicate whether to perform CSI measurements assuming that each beam measurement reference signal resource received simultaneously by the wireless device corresponds to a different transmission layer or assuming that each beam measurement reference signal resource received simultaneously by the wireless device carries the same information, if group based beam reporting is enabled.

In some instances, configuring the beam measurement and channel state information framework may include receiving capability information from the wireless device. For example, the capability information could indicate whether the wireless device supports performing CSI measurements based on beam measurement reference signal resources. As another possibility, the capability information could indicate a number of beam measurement reference signal resources based on which the wireless device can perform CSI measurements. As a further possibility, the capability information could indicate a number of ports available to perform CSI measurements based on beam measurement reference signal resources per slot. Such information may be taken into account by the cellular base station when determining how to configure the wireless device to perform beam and CSI measurements and reporting.

In 604, the base station may provide the beam management reference signals. This may include providing the SSBs and/or the CSI-RS for BM, e.g., as configured by the base station. The wireless device may receive the beam management reference signals and perform beam and CSI measurements using the beam management reference signals. These may include, for example, measuring RSRP/SINR for each beam management reference signal resource, as well as CQI and/or other CSI measurements for each beam management reference signal resource. If the beam management reference signals include both SSB resources and CSI-RS for BM resources, it may be the case that the wireless device performs the CSI measurements based on those resources jointly, e.g., if configured to do so by the base station.

If group based beam reporting is enabled, the wireless device may perform the CSI measurements in accordance with the configuration of the base station with respect to whether to assume that each beam measurement reference signal resource received simultaneously by the wireless device corresponds to a different transmission layer or to assume that each beam measurement reference signal resource received simultaneously by the wireless device carries the same information, at least according to some embodiments. For example, if assuming that each beam measurement reference signal resource received simultaneously by the wireless device corresponds to a different transmission layer, each beam may be considered interference to each other beam, and the wireless device may report different CQI values for each beam. Alternatively, if assuming that each beam measurement reference signal resource received simultaneously by the wireless device carries the same information, the wireless device may report only one CQI value for a group of beam measurement reference signal resources received simultaneously by the wireless device, at least according to some embodiments.

In 606, the wireless device may provide a CSI report to the base station, e.g., based on the beam management reference signals. As previously noted, in some instances, the cellular base station may provide information indicating a manner in which to perform the CSI reporting based on beam management reference signal resources, for example including whether to perform CSI reporting on an absolute basis or on a relative basis. According to some embodiments, if the beam and CSI measurement configuration information indicates to perform CSI reporting on an absolute basis, the CSI report may indicate absolute CSI measurement results for each of the beam measurement reference signal resources. If the beam and CSI measurement configuration information indicates to perform CSI reporting on a relative basis, the CSI report may indicate an absolute CSI measurement result for a reference beam measurement reference signal resource and a differential CSI measurement result for each other beam measurement reference signal resource. The differential CSI measurement result may include a difference between the CSI measurement value of a beam measurement reference signal resource and the CSI measurement value of the reference beam measurement reference signal resource. The reference beam measurement reference signal resource may be the first (e.g., temporally) beam measurement reference signal resource provided by the base station, or the beam measurement reference signal resource with a highest measurement result (e.g., RSRP/SINR/CQI/etc.) of the beam measurement reference signal resources provided by the base station, or may be determined based on any of various other possible considerations, e.g., as configured by the base station. Alternatively, note that such a configuration for performing CSI reporting based on beam measurement reference signal resources could be specified in one or more specification documents for a cellular communication standard according to which the wireless device and the cellular base station operate, such as a 3GPP cellular communication standard.

In 608, the base station and the wireless device may communicate using a beam, MCS, and precoder selected based on the illustrated beam, MCS, and precoder selection process. Thus, according to the method of FIG. 6, it may be possible to reduce the overhead and latency associated with the beam, MCS, and precoder selection process for a wireless device and a cellular base station, e.g., as the amount of signaling and the number of signaling exchanges may be reduced relative to an approach in which beam measurements and CSI measurements are performed on separately and sequentially provided sets of reference signals.

Figure 8:
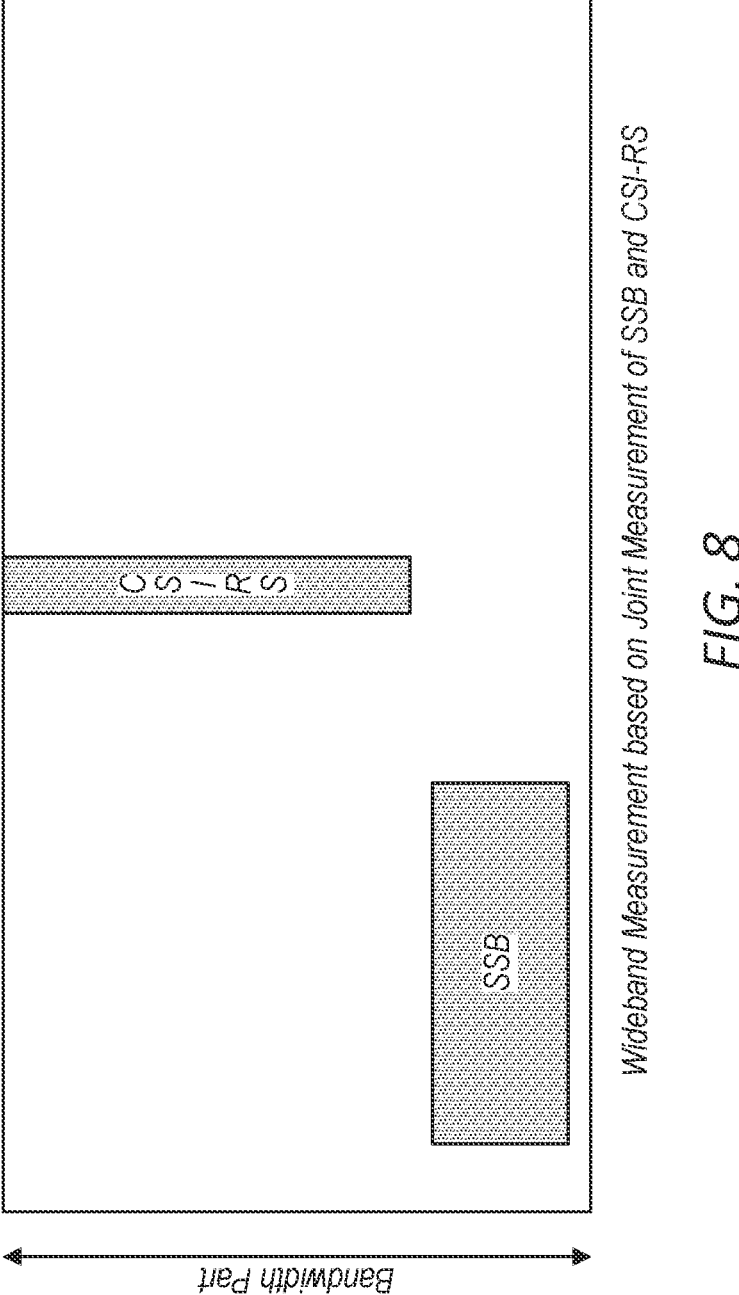
FIG. 8 illustrates aspects of a possible scheme in which joint measurement of synchronization signal block and channel state information reference signal resources is used by a wireless device to determine channel state information.

FIGS. 7-8—Additional Information

FIGS. 7-8 illustrate further aspects that might be used in conjunction with the method of FIG. 6, if desired. It should be noted, however, that the exemplary details illustrated in and described with respect to FIGS. 7-8 are not intended to be limiting to the disclosure as a whole: numerous variations and alternatives to the details provided herein below are possible and should be considered within the scope of the disclosure.

According to the approach illustrated in FIG. 6, control signaling may be introduced to support configuration of CSI reporting by a wireless device based on BM RS. However, note that it may be the case that some existing beam management and/or channel state information framework elements may be modified to support such operation. For example, as the wireless device complexity for CSI measurements may be higher than for RSRP/SINR measurements, it could be the case that certain restrictions for the BM RS could be implemented and/or certain additional UE capability parameters could be defined. As another example, as the SSB may typically be transmitted with a limited bandwidth (e.g., which may be less than that of a bandwidth part in which the base station operates), it may be the case that CSI measured solely based on SSBs may not accurately reflect the CSI for the whole bandwidth. Accordingly, at least as one possibility, joint SSB-CSI-RS based measurement could be used, e.g., to increase the measurement accuracy.

FIG. 7 illustrates a possible set of channel state information reporting configuration options according to which a base station could configure a wireless device, according to some embodiments. In particular, the values illustrated in FIG. 7 may include possible values of a reportQuantity parameter that can be configured by a gNB in a CSI-reportConfig information element (IE) and provided to a UE, e.g., using RRC signaling. Thus, the reportQuantity parameter could be configured as 'ssb-Index-CQI', to indicate to a UE to measure CQI using SSB resources, or as 'cri-CQI', to indicate to a UE to measure CQI using CSI-RS for BM resources. Note that the illustrated parameter values are provided by way of example only, and are not intended to be limiting to the disclosure as a whole, as any number of other parameter values could also or alternatively be used, according to various embodiments.

According to some embodiments, if a UE is configured with 'ssb-Index-CQI' for a CSI-reportConfig, and if group based beam reporting is not enabled, it may be the case that the UE can perform beam reporting on N SSB resource indices, as well as report the CQI for each SSB resource index. Similarly, according to some embodiments, if a UE is configured with 'cri-CQI' for a CSI-reportConfig, and if group based beam reporting is not enabled, it may be the case that the UE can perform beam reporting on N CSI-RS resource indices (CRIs), as well as report the CQI for each CRI. As one option, the reported CQI could be based on absolute CQI for each resource. As another option, absolute CQI could be reported for the best SSB/CSI-RS, and differential CQI can be reported for the other N−1 SSBs/CSI-RSs. As a further option, absolute CQI could be reported for the first SSB/CSI-RS, and differential CQI can be reported for the other N−1 SSBs/CSI-RSs. For the differential reporting approaches, the differential CQI for a SSB/CSI-RS may be calculated as a difference between the CQI for that SSB/CSI-RS and the CQI for the reference SSB/CSI-RS (e.g., the best SSB/CSI-RS, or the first SSB/CSI-RS, among various options), at least in some instances. Note that, according to some embodiments, N can be configured by higher layer signaling, and that the maximum value of N that is supported by a UE can be reported using UE capability information.

According to some embodiments, if a UE is configured with 'ssb-Index-CQI' or 'cri-CQI' for a CSI-reportConfig, and if group based beam reporting is enabled, it may be the case that the UE can perform beam reporting on for M (e.g., M=2, as one possible example) SSBRI/CRI, as well as report the CQI for each resource index. As one option, the reported CQI could be calculated with the assumption that each SSBRI/CRI corresponds to a different transmission layer received simultaneously by the UE. As another option, the reported CQI could be calculated with the assumption that each SSBRI/CRI carries the same information and is received simultaneously by the UE. Note that, according to some embodiments, which option is used by a UE can be configured by higher layer signaling. As a still further possibility, it may be the case that the cellular base station is configured to not enable group based beam reporting with reportQuantity set to 'ssb-Index-CQI' or 'cri-CQI'.

As previously mentioned herein, it may be beneficial to provide support for reporting of certain UE capability information in conjunction with the techniques described herein. As one example, support may be provided for a UE to report whether it supports performing CSI measurements on SSB and/or CSI-RS for BM. As another example, support may be provided for a UE to report a maximum number of resources on which to measure CSI based on SSB and/or CSI-RS for BM. As a further example, support may be provided for a UE to report a maximum number of total ports across all resources to measure CSI based on SSB and/or CSI-RS per slot.

In some instances, one or more signaling restrictions may be agreed upon in conjunction with supporting use of SSB/CSI-RS for BM based CSI measurements, e.g., for dedicated interference measurement resources (IMR), e.g., to potentially allow for simpler implementation complexity. As one option, it may be agreed that IMR are not configured for SSB/CSI-RS for BM based CSI measurements. As another option, zero-power CSI-IM can be optionally configured. As a further option, it may be the case that non-zero-power (NZP) IMR can be optionally configured. As a still further alternative, for SSB based CSI measurement, it may be the case that IMR to measure interference are configured in different time/frequency resources, e.g., since the gNB may be unable to change its time/frequency pattern in such a scenario. In some instances, the measurement restriction for channel measurement resource (CMR) may not be applicable when SSB is configured as CMR. In some instances, it may be the case that for SSB/CSI-RS for BM based CSI measurements, only wideband based measurements are allowed.

According to some embodiments, when CSI-RS for BM is configured as CMR for a reportQuantity as 'cri-CQI', it may be agreed that only 1 port CSI-RS can be configured. As a further extension, it could be the case that only the frequency density with 3 REs/RB can be configured. Alternatively, when CSI-RS for BM is configured as CMR for a reportQuantity as 'cri-CQI', it may be agreed that both 1 port and 2 port CSI-RS can be configured. In such a scenario, for 2 port CSI-RS, the measured CQI may be based on a predefined/configured precoder, or alternatively, the measured CQI may be based on the best precoder with a possible rank restriction. For example, it could be the case that only rank 1 is selected. As another example, the restricted rank can be configured by the gNB.

As the bandwidth of a SSB may be limited (e.g., may be less than that of a bandwidth part in which a base station operates), if desired, joint SSB-CSI-RS based measurement can be used to support wide-band measurement. FIG. 8 illustrates aspects of such a possible scheme, according to some embodiments. In such a scenario, for each SSB, it may be the case that the gNB can configure up to X (e.g., X=1, as one possibility) associated CSI-RS resources. The UE may measure CQI based on the SSB and the CSI-RS jointly, and the associated CSI-RS can be configured by RRC signaling. According to some embodiments, the associated CSI-RS may be quasi-co-located (QCLed) with the SSB; it may be the case that the QCL should at least include QCL-typeD parameter (spatial Rx parameters). The associated CSI-RS could be multiplexed with the SSB in a time domain multiplexing (TDM) manner or a frequency domain multiplexing (FDM) manner. It may be the case that only 1 port CSI-RS can be configured.

For such joint SSB-CSI-RS based measurement, according to some embodiments, the reported CQI may be compensated by a power offset between the SSB/CSI-RS and the physical downlink shared channel (PDSCH). For example, if the power offset between the CSI-RS and the PDSCH is $P_c$, the power offset to be compensated for in the CQI calculation could be based on $P_c$. As another possibility, if the power offset between the SSB and the CSI-RS is $P_c\_SS$ and the power offset between the CSI-RS and the PDSCH is $P_c$, the power offset to be compensated for in the CQI calculation could be based on $P_c + P_c\_SS$. In some embodiments, alternatively, it may be the case that the reported CQI is not compensated for by the power offset between the SSB/CSI-RS and the PDSCH, e.g., in which case it may be the responsibility of the base station to account for any such power offset.

In the following further exemplary embodiments are provided.

One set of embodiments may include an apparatus, comprising: a processor configured to cause a wireless device to: receive beam and channel state information (CSI) measurement configuration information from a cellular base station, wherein the beam and CSI measurement configuration information indicates beam measurement reference signal resources to use for beam and CSI measurements; perform beam measurements using the beam measurement reference signal resources; perform CSI measurements using the beam measurement reference signal resources; and provide a CSI report to the cellular base station based at least in part on the CSI measurements.

According to some embodiments, the CSI measurements include channel quality indicator (CQI) measurements.

According to some embodiments, the CSI report indicates absolute CSI measurement results for each of the beam measurement reference signal resources.

According to some embodiments, the CSI report indicates an absolute CSI measurement result for a reference beam measurement reference signal resource, wherein the CSI report indicates a differential CSI measurement result for each other beam measurement reference signal resource.

According to some embodiments, the reference beam measurement reference signal resource comprises one of: a beam measurement reference signal resource provided by the cellular base station earliest in time of the beam measurement reference signal resources; or a beam measurement reference signal resource with a highest measurement result of the beam measurement reference signal resources.

According to some embodiments, the beam measurement reference signal resources include synchronization signal block (SSB) resources and channel state information reference signal (CSI-RS) for beam management resources, wherein the processor is further configured to cause the wireless device to: receive radio resource control (RRC) signaling indicating that each respective beam measurement reference signal resource includes a respective SSB resource and one or more CSI-RS resources associated with the respective SSB resource; and perform the CSI measurements for each respective beam measurement reference signal resource based on the respective SSB resource and one or more CSI-RS resources associated with the respective SSB resource jointly.

Another set of embodiments may include a wireless device, comprising: an antenna; a radio operably coupled to the antenna; and a processor operably coupled to the radio; wherein the wireless device is configured to: receive beam and channel state information (CSI) measurement configuration information from a cellular base station, wherein the beam and CSI measurement configuration information indicates beam measurement reference signal resources to use for beam and CSI measurement; perform beam measurements using the beam measurement reference signal resources; perform CSI measurements using the beam measurement reference signal resources; and provide a CSI report to the cellular base station based at least in part on the CSI measurements.

According to some embodiments, the wireless device is further configured to: provide a wireless device capability indication to the cellular base station indicating whether it supports performing CSI measurements based on beam measurement reference signal resources.

According to some embodiments, the wireless device is further configured to: provide a wireless device capability indication to the cellular base station indicating a number of beam measurement reference signal resources based on which the wireless device can perform CSI measurements.

According to some embodiments, the wireless device is further configured to: provide a wireless device capability indication to the cellular base station indicating a number of ports available to perform CSI measurements based on beam measurement reference signal resources per slot.

According to some embodiments, the beam and CSI measurement configuration information enables group based beam reporting, wherein the beam and CSI measurement configuration information indicates whether to perform the CSI measurements assuming that each beam measurement reference signal resource received simultaneously by the wireless device corresponds to a different transmission layer or assuming that each beam measurement reference signal resource received simultaneously by the wireless device carries the same information, wherein the wireless device is further configured to: perform the CSI measurements assuming that each beam measurement reference signal resource received simultaneously by the wireless device corresponds to a different transmission layer if the cellular base station indicates to perform the CSI measurements assuming that each beam measurement reference signal resource received simultaneously by the wireless device corresponds to a different transmission layer; and perform the CSI measurements assuming that each beam measurement reference signal resource received simultaneously by the wireless device carries the same information if the cellular base station indicates to perform the CSI measurements assuming that each beam measurement reference signal resource received simultaneously by the wireless device carries the same information.

According to some embodiments, the beam measurement reference signal resources include synchronization signal block (SSB) resources.

According to some embodiments, the beam measurement reference signal resources include channel state information reference signal (CSI-RS) resources with a radio resource control parameter repetition configured.

Still another set of embodiments may include a method, comprising: by a cellular base station: providing beam and channel state information (CSI) measurement configuration information to a wireless device, wherein the beam and CSI measurement configuration information indicates beam measurement reference signal resources to use for beam and CSI measurement; providing the beam measurement reference signal resources; and receiving a CSI report from the wireless device, wherein the CSI report is based on CSI measurements performed using the beam measurement reference signal resources.

According to some embodiments, the beam and CSI measurement configuration information indicates to the wireless device whether to perform CSI reporting on an absolute basis or on a relative basis.

According to some embodiments, if the beam and CSI measurement configuration information indicates to perform CSI reporting on an absolute basis, the CSI report indicates absolute CSI measurement results for each of the beam measurement reference signal resources.

According to some embodiments, if the beam and CSI measurement configuration information indicates to perform CSI reporting on a relative basis, the CSI report indicates an absolute CSI measurement result for a reference beam measurement reference signal resource and a differential CSI measurement result for each other beam measurement reference signal resource.

According to some embodiments, the method further comprises: receiving wireless device capability information from the wireless device, wherein the wireless device capability information indicates one or more of: whether the wireless device supports performing CSI measurements based on beam measurement reference signal resources; a number of beam measurement reference signal resources based on which the wireless device can perform CSI measurements; or a number of ports of the wireless device available to perform CSI measurements based on beam measurement reference signal resources per slot.

According to some embodiments, the beam measurement reference signal resources include one or more of: synchronization signal block (SSB) resources; or channel state information reference signal (CSI-RS) resources with a radio resource control parameter repetition configured.

According to some embodiments, the beam and CSI measurement configuration information indicates that each beam measurement reference signal resource includes a respective SSB resource and one or more CSI-RS resources associated with the respective SSB resource.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
   providing a wireless device capability indication to a cellular base station indicating support or lack of support for performing channel state information (CSI) measurements based on beam measurement reference signal resources and interference measurement resources, wherein the wireless device capability indication further indicates a number of ports available to perform CSI measurements based on beam measurement reference signal resources per slot;
   receiving beam and CSI measurement configuration information from the cellular base station, wherein the beam and CSI measurement configuration information indicates beam measurement reference signal resources to use for beam and CSI measurements;

performing beam measurements using the beam measurement reference signal resources;
   performing CSI measurements using the beam measurement reference signal resources; and
   providing a CSI report to the cellular base station based at least in part on the CSI measurements.

2. The method of claim 1, wherein the CSI measurements include channel quality indicator (CQI) measurements.

3. The method of claim 1, wherein the CSI report indicates absolute CSI measurement results for each of the beam measurement reference signal resources.

4. The method of claim 1, wherein the CSI report indicates an absolute CSI measurement result for a reference beam measurement reference signal resource, wherein the CSI report indicates a differential CSI measurement result for each other beam measurement reference signal resource.

5. The method of claim 4, wherein the reference beam measurement reference signal resource comprises one of:
   a beam measurement reference signal resource provided by the cellular base station earliest in time of the beam measurement reference signal resources; or
   a beam measurement reference signal resource with a highest measurement result of the beam measurement reference signal resources.

6. The method of claim 1, wherein the beam measurement reference signal resources include synchronization signal block (SSB) resources and channel state information reference signal (CSI-RS) for beam management resources, wherein the beam and CSI measurement configuration information further indicates interference measurement resources to use for beam and CSI measurements, wherein the interference measurement resources include at least one of zero-power interference measurement resources or non-zero-power interference measurement resources, wherein the method further comprises:
   receiving radio resource control (RRC) signaling indicating that each respective beam measurement reference signal resource includes a respective SSB resource and one or more CSI-RS resources associated with the respective SSB resource; and
   performing the CSI measurements for each respective beam measurement reference signal resource based on the respective SSB resource and one or more CSI-RS resources associated with the respective SSB resource jointly.

7. The method of claim 1,
   wherein the wireless device capability indication to the cellular base station further indicates a number of beam measurement reference signal resources based on which a wireless device can perform CSI measurements.

8. The method of claim 1, wherein the beam and CSI measurement configuration information enables group based beam reporting, wherein the beam and CSI measurement configuration information indicates whether to perform the CSI measurements assuming that each beam measurement reference signal resource received simultaneously corresponds to a different transmission layer or assuming that each beam measurement reference signal resource received carries the same information, wherein the method further comprises:
   performing the CSI measurements assuming that each beam measurement reference signal resource received simultaneously corresponds to a different transmission layer if the cellular base station indicates to perform the CSI measurements assuming that each beam measurement reference signal resource received simultaneously corresponds to a different transmission layer; and performing the CSI measurements assuming that each beam measurement reference signal resource received simultaneously carries the same information if the cellular base station indicates to perform the CSI measurements assuming that each beam measurement reference signal resource received simultaneously carries the same information.

9. The method of claim 1, wherein the beam measurement reference signal resources include synchronization signal block (SSB) resources.

10. The method of claim 1, wherein the beam measurement reference signal resources include channel state information reference signal (CSI-RS) resources with a radio resource control parameter repetition configured.

11. The method of claim 1, wherein the beam and CSI measurement configuration information further indicates interference measurement resources, wherein the interference measurement resources include zero-power interference measurement resources.

12. The method of claim 1, wherein the beam and CSI measurement configuration information further indicates interference measurement resources, wherein the interference measurement resources include non-zero-power interference measurement resources.

13. An apparatus, comprising:

a processor configured to, when executing instructions stored in a memory, perform operations comprising:

providing a wireless device capability indication to a cellular base station indicating support or lack of support for performing channel state information (CSI) measurements based on beam measurement reference signal resources and interference measurement resources, wherein the wireless device capability indication further indicates a number of ports available to perform CSI measurements based on beam measurement reference signal resources per slot;

receiving beam and CSI measurement configuration information from the cellular base station, wherein the beam and CSI measurement configuration information indicates beam measurement reference signal resources to use for beam and CSI measurements;

performing beam measurements using the beam measurement reference signal resources;

performing CSI measurements using the beam measurement reference signal resources; and providing a CSI report to the cellular base station based at least in part on the CSI measurements.

14. The apparatus of claim 13, further comprising a radio coupled to the processor.

15. A method, comprising:

receiving a wireless device capability indication from a wireless device indicating support or lack of support for performing channel state information (CSI) measurements based on beam measurement reference signal resources and interference measurement resources, wherein the wireless device capability indication further indicates a number of ports available to perform CSI measurements based on beam measurement reference signal resources per slot;

providing beam and CSI measurement configuration information to the wireless device, wherein the beam and CSI measurement configuration information indicates beam measurement reference signal resources to use for beam and CSI measurement;

providing the beam measurement reference signal resources; and receiving a CSI report from the wireless device, wherein the CSI report is based on CSI measurements performed using the beam measurement reference signal resources.

16. The method of claim 15, wherein the beam and CSI measurement configuration information indicates to the wireless device whether to perform CSI reporting on an absolute basis or on a relative basis;

wherein if the beam and CSI measurement configuration information indicates to perform CSI reporting on an absolute basis, the CSI report indicates absolute CSI measurement results for each of the beam measurement reference signal resources; and wherein if the beam and CSI measurement configuration information indicates to perform CSI reporting on a relative basis, the CSI report indicates an absolute CSI measurement result for a reference beam measurement reference signal resource and a differential CSI measurement result for each other beam measurement reference signal resource.

17. The method of claim 15, wherein the wireless device capability indication further indicates a number of beam measurement reference signal resources based on which the wireless device can perform CSI measurements.

18. The method of claim 15, wherein the beam measurement reference signal resources include one or more of:

synchronization signal block (SSB) resources; or channel state information reference signal (CSI-RS) resources with a radio resource control parameter repetition configured; and wherein the beam and CSI measurement configuration information indicates that each beam measurement reference signal resource includes a respective SSB resource and one or more CSI-RS resources associated with the respective SSB resource.

\* \* \* \* \*